(12) United States Patent
Schaupmann et al.

(10) Patent No.: US 11,843,163 B2
(45) Date of Patent: Dec. 12, 2023

(54) ELECTRONIC ARRANGEMENT FOR AN AIRCRAFT AND METHOD FOR PROVIDING SUCH AN ELECTRONIC ARRANGEMENT

(71) Applicant: Airbus Operations GmbH, Hamburg (DE)

(72) Inventors: Christian Schaupmann, Hamburg (DE); Markus Altmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 84 days.

(21) Appl. No.: 17/606,849

(22) PCT Filed: Jun. 29, 2020

(86) PCT No.: PCT/EP2020/068197
§ 371 (c)(1),
(2) Date: Oct. 27, 2021

(87) PCT Pub. No.: WO2021/001295
PCT Pub. Date: Jan. 7, 2021

(65) Prior Publication Data
US 2022/0216601 A1    Jul. 7, 2022

(30) Foreign Application Priority Data
Jun. 30, 2019 (DE) .......................... 102019117627.1

(51) Int. Cl.
*H01Q 1/28* (2006.01)
*B64C 1/36* (2006.01)
(Continued)

(52) U.S. Cl.
CPC ............... *H01Q 1/286* (2013.01); *B64C 1/36* (2013.01); *H01Q 1/42* (2013.01); *H01Q 21/24* (2013.01)

(58) Field of Classification Search
CPC .......... H01Q 1/286; H01Q 1/283; H01Q 1/42; H01Q 21/24; B64C 1/36
See application file for complete search history.

(56) References Cited

U.S. PATENT DOCUMENTS

| 2,503,109 A | 4/1950 | Harris |
| 6,047,925 A | 4/2000 | Rivera et al. |

(Continued)

FOREIGN PATENT DOCUMENTS

| CN | 204696229 U | 10/2015 |
| CN | 204937468 U | 1/2016 |

(Continued)

OTHER PUBLICATIONS

German Search Report; priority document.
International Search Report and Written Opinion; priority document.

*Primary Examiner* — Hoang V Nguyen
(74) *Attorney, Agent, or Firm* — Greer, Burns & Crain, Ltd.

(57) ABSTRACT

An opening completely arranged in a skin panel of a structural portion of the aircraft is formed in the outer skin of the skin panel, and for each of the skin panels with one of the openings, an associated structural element of an electronic arrangement is separately provided. The structural element is designed and detachably fastened by a frame thereof to the outer skin in the corresponding skin panel on the side of the outer skin opposite the outer surface, such that it seals the corresponding opening such that the skin panel has at least the same pressure-tightness and at least the same strength relative to tension, pressure and shear forces which act in the skin panel in the extension direction of the outer skin as the same skin panel without the corresponding opening.

19 Claims, 6 Drawing Sheets

(51) Int. Cl.
*H01Q 1/42* (2006.01)
*H01Q 21/24* (2006.01)

(56) References Cited

U.S. PATENT DOCUMENTS

| | | |
|---|---|---|
| 8,063,837 B1 | 11/2011 | Jennings et al. |
| 8,149,177 B1 | 4/2012 | Callus et al. |
| 2019/0326665 A1 | 10/2019 | Juergens et al. |

FOREIGN PATENT DOCUMENTS

| | | | | |
|---|---|---|---|---|
| CN | 112061370 A | * | 12/2020 | ............... B64C 1/12 |
| DE | 102018109723 A1 | | 10/2019 | |

* cited by examiner

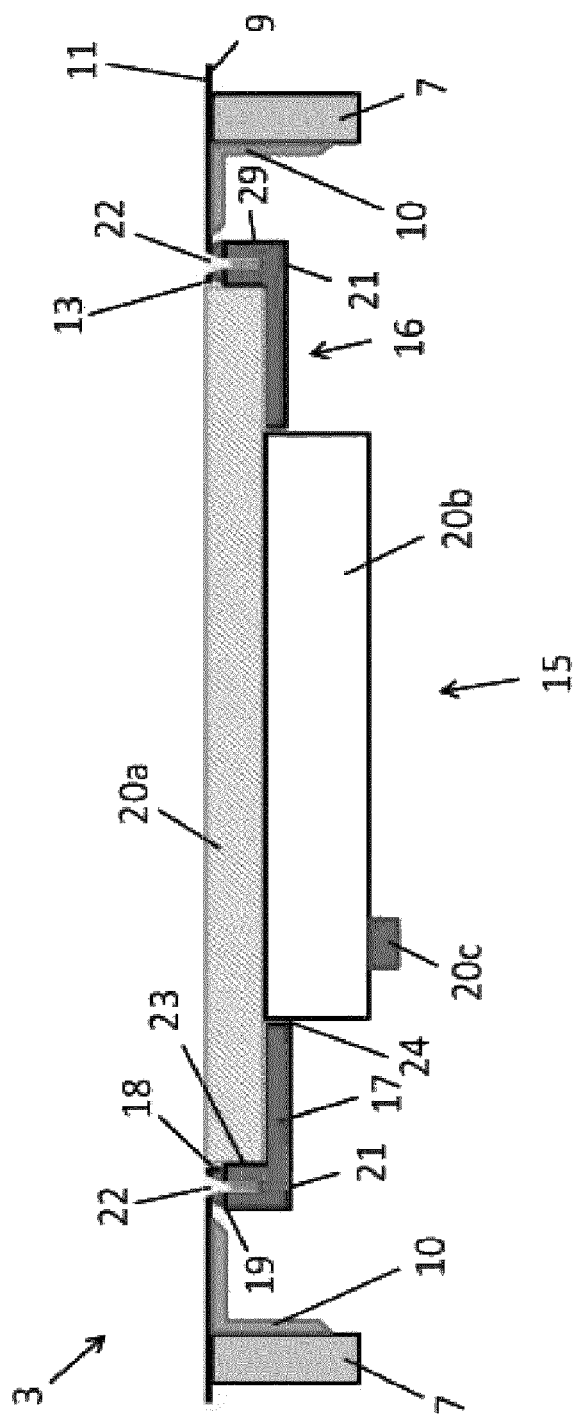

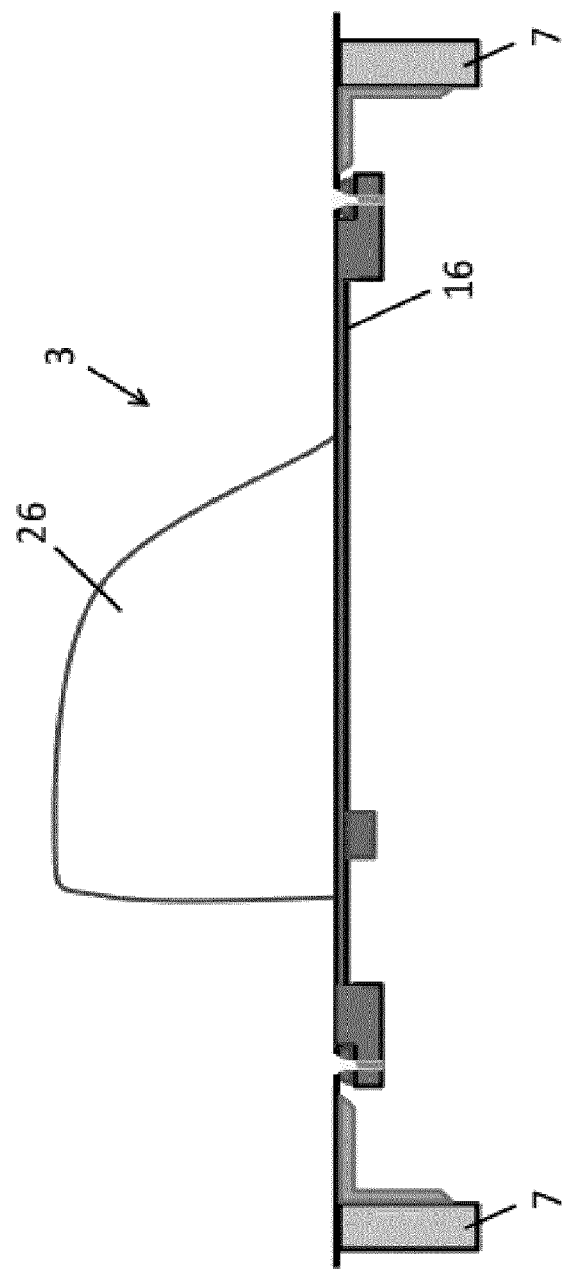

ELECTRONIC ARRANGEMENT FOR AN AIRCRAFT AND METHOD FOR PROVIDING SUCH AN ELECTRONIC ARRANGEMENT

CROSS-REFERENCES TO RELATED APPLICATIONS

This application claims the benefit of the International Application No. PCT/EP2020/068197, filed on Jun. 29, 2020, and of the German patent application No. 102019117627.1 filed on Jun. 30, 2019, the entire disclosures of which are incorporated herein by way of reference.

FIELD OF THE INVENTION

The present application relates to an electronic arrangement for an aircraft or of an aircraft, which has a structural portion of a structure of an aircraft having a reinforcement arrangement of elongate longitudinal and transverse reinforcement elements which are connected to each other and an outer skin and an electronic component.

BACKGROUND OF THE INVENTION

Aircraft typically have one or more antenna(e) or other electronic devices via which a radio connection can be produced between the aircraft and external apparatuses or participants on the ground or in the air, such as, for example, other aircraft or satellites, or which perform other functions, such as, for example, sensors or laser devices.

In the prior art, such antennae or other electronic devices have been mounted inter alia externally on the aircraft fuselage with an opening being formed with minimal dimensions in the outer skin so that they protrude externally from the aircraft fuselage into the air surrounding it. On the one hand, the air resistance of the aircraft is thereby increased, which increases the fuel consumption during operation, and, on the other hand, for each aircraft type, for each electronic device and each positioning of the electronic device, the aerodynamic pressure and suction forces which occur on the outer faces of the electronic device and which are also referred to as aerodynamic loads must be recalculated so that there is a high level of calculation and certification complexity. In addition, some antenna elements or other electronic devices have been secured to the fuselage by means of a base plate which has a relatively high weight and together with the actual antenna element or the actual other electronic device protrudes into the surrounding air.

In other embodiments, antenna elements of such antennae or components of other electronic devices have been integrated directly into the outer skin of the aircraft fuselage by having been provided as a layer of a multi-layer outer skin. With such antennae, however, maintenance operations and subsequent replacement after production are complex and, furthermore, the transmission and receiving properties thereof or other functions may be impaired in the event of a deformation of the fuselage or outer skin which occurs during operation of the aircraft.

SUMMARY OF THE INVENTION

An object of the present invention is therefore to provide an electronic arrangement for an aircraft which is constructed in a simple and cost-effective manner, and which can be configured in such a simple manner, that it enables low air resistance of the aircraft, is easy to install and maintain and has a low weight, an aircraft having such an electronic arrangement and a method for providing such an electronic arrangement.

According to the present invention, there is provided an electronic arrangement for an aircraft or of an aircraft which has a structural portion of a or the aircraft or, more specifically—a structural portion of a structure or a part-structure of the aircraft—and one or more structural elements which each have a preferably rigid or stiff frame and one or more electronic component(s) which is/are secured to the frame of the respective structural element. Each of the structural elements may further have a cover for protecting the electronic components. When the electronic components comprise an antenna element, such a cover is preferably constructed in such a manner that it is permeable with respect to radio waves which are emitted by the antenna element during operation and radio waves which can be received, or which are intended to be received by the antenna element.

The structural portion which may, for example, be a fuselage structural portion of the aircraft or a fuselage structure of the fuselage of the aircraft or a structural portion of a rudder unit structure of a rudder unit or a wing structure of a wing of the aircraft, has a reinforcement arrangement of elongate longitudinal and transverse reinforcement elements which are connected to each other. The reinforcement arrangement of elongate longitudinal and transverse reinforcement elements which are connected to each other has a plurality of elongate longitudinal reinforcement elements which preferably extend parallel with each other and a plurality of elongate transverse reinforcement elements which preferably extend parallel with each other. The longitudinal reinforcement elements extend at an angle with respect to the transverse reinforcement elements, wherein the longitudinal reinforcement elements, when the structural portion is in the state installed in an aircraft, preferably extend in the longitudinal direction of the aircraft fuselage and the transverse reinforcement elements, when the structural portion is in the state installed in an aircraft, preferably extend in the circumferential direction of the aircraft fuselage. The longitudinal reinforcement elements are also referred to as stringers and the transverse reinforcement elements are referred to as ribs. The longitudinal and transverse reinforcement elements are preferably connected to each other in a grid-like manner so that they on the whole form a grid arrangement.

The structural portion further has an outer skin which is arranged at one side of the reinforcement arrangement of longitudinal and transverse reinforcement elements—or at one side of the corresponding grid arrangement—and secured to the longitudinal and transverse reinforcement elements. This securing can be carried out directly without additional elements between the outer skin and the respective longitudinal or transverse reinforcement element or indirectly by means of intermediate elements and may be different for different elements of the longitudinal and transverse reinforcement elements. For example, there may be provision for the outer skin to be positioned directly on the longitudinal reinforcement elements and to be secured directly thereto, but for clips to be arranged between the transverse reinforcement elements and the outer skin, via which clips the outer skin is secured to the transverse reinforcement elements. In any case, an expanded face of the outer skin facing away from the longitudinal and transverse reinforcement elements, or the arrangement of longitudinal and transverse reinforcement elements forms an outer face or outer side of the structural portion and, when the structural portion is in the state installed in an aircraft, of the entire aircraft. In other words, the outer skin is arranged and secured on the longitudinal and transverse reinforcement elements in such a manner that a first face faces the outer skin of the reinforcement arrangement of longitudinal and transverse reinforcement elements and a second face of the outer skin opposite the first face forms an outer face or outer side of the structural portion which, when the structural portion is in the state installed in an aircraft, faces the environment of the aircraft.

Furthermore, the structural portion has one or more skin panels, each of which is a portion of the outer skin which is defined between two directly adjacent longitudinal reinforcement elements of the longitudinal reinforcement elements and two directly adjacent transverse reinforcement elements of the transverse reinforcement elements. In other words, each of the skin panels extends between the two mutually facing inner lateral edges or side faces of two directly adjacent longitudinal reinforcement elements of the reinforcement arrangement and between the two mutually facing inner lateral edges or side faces of two directly adjacent transverse reinforcement elements of the reinforcement arrangement. This also means that an interruption which divides one of the longitudinal reinforcement elements or one of the transverse reinforcement elements of the reinforcement arrangement into two portions at opposing sides of the interruption which terminate at the relevant skin panel is not arranged in any of the skin panels. The skin panels are accordingly defined by the normal "cells" of a grid arrangement which is formed by the reinforcement arrangement. It is in this instance possible for the structural portion to have exclusively skin panels of this embodiment or, in addition to the mentioned skin panels, for skin panels which are configured differently also to be provided.

The frame of each of the structural elements—or the structural element if only one is provided—may, for example, be constructed from aluminum and may in particular be a milled aluminum component and may be plate-like, for example. One or more and preferably all of the electronic components of each of the structural elements are preferably arranged in such a manner that they are arranged completely or partially at the same side of the frame as the outer face of the structural portion. The electronic components may be any type of electronic component or electronic device or apparatus. In particular, one, more or all of the electronic components may, for example, be an antenna element, an antenna electronic system, a sensor, a laser device or a portion of a laser device or a communication device or part of a communication device.

In any case, in one, more or all of the skin panels mentioned, there is formed in each case in the outer skin an opening or through-opening which is arranged completely in the respective skin panel and which, for example, may have a circular, oval, round, polygonal, rectangular or square shape. Accordingly, the entire opening and the boundary thereof is located completely in the respective skin panel and no portion of the opening is located outside the skin panel and, in particular, not in the region of the longitudinal and transverse reinforcement elements adjacent to the skin panel or adjacent skin panels. Therefore, the longitudinal and transverse reinforcement elements are not changed in the region or the environment of the skin panel by the electronic arrangement. For each of the skin panels with one of the openings, an associated one of the structural elements is further provided separately. This element is configured and releasably secured with the frame thereof to the outer skin in the corresponding skin panel at the side of the outer skin opposite the outer surface in such a manner that it closes the corresponding opening in such a manner that the skin panel has at least the same pressure tightness and at least the same resistance with respect to tensile, pressure and shearing forces which act in the extent direction of the outer skin in the skin panel or in the plane defined by the outer skin in the skin panel as the same skin panel without the corresponding opening, that is to say, the undisturbed skin panel without the opening and the structural element which is secured thereto. The resistance with respect to tensile and pressure forces which act in the extent direction of the outer skin in the skin panel or in the plane defined by the outer skin in the skin panel can also be referred to as normal resistance and indicates an amount for the resistance with which the outer skin in the skin panel counteracts tensile and pressure forces which act parallel with the surface of the outer skin or tangentially with respect to the outer skin, that is to say, perpendicularly to the thickness direction of the outer skin. The resistance with respect to shearing forces which act in the extent direction of the outer skin in the skin panel or in the plane defined by the outer skin in the skin panel can also be referred to as shearing strength and indicates an amount for the resistance with which the outer skin in the skin panel counteracts shearing forces which act parallel with the surface of the outer skin or tangentially with respect to the outer skin, that is to say, perpendicularly to the thickness direction of the outer skin.

This means that the respective structural element is arranged in such a manner that it completely fills or completely covers the respective opening. It also means that the outer skin in the respective skin panel is connected to the respective structural element in such a manner that tensile, pressure and shearing forces acting in the outer skin in the skin panel are transmitted by the structural element between opposing sides of the opening in order on the whole to achieve at least the same resistance with respect to tensile, pressure and shearing forces which act in the extent direction of the outer skin in the skin panel or in the plane defined by the outer skin in the skin panel as in the undisturbed skin panel. The structural elements are accordingly, in each case, an element which transmits such tensile, pressure and shearing forces and which can be integrated directly in the outer skin. With respect to the transmission of these tensile, pressure and shearing forces and the pressure tightness, the structural element completely replaces the load-bearing components of the outer skin lacking as a result of the opening. Furthermore, in the state installed in an aircraft the structural element absorbs the internal pressure applied within the aircraft and, in particular, closes the respective opening when viewed from the inner side of the aircraft in a pressure-tight manner.

One, more or all of the electronic components of each of the structural elements is/are preferably arranged completely or partially in the region of the opening—that is to say, completely or at least partially below the opening if the outer face of the structural portion is defined as facing upward or is viewed perpendicularly with respect to the opening—at the side of the outer skin opposite the outer face or the outer side. That is to say, when the structural portion is in the state installed in an aircraft, the respective electronic component is located inside the aircraft with respect to the outer skin. Such an arrangement is, for example, particularly advantageous for electronic components in the form of antenna elements.

The electronic arrangement described has the advantage that, although, as a result of the construction of the opening in a skin panel, the structural mechanical properties thereof and the pressure tightness of the outer skin are impaired or reduced, as a result of the structural element they are produced again or even improved with respect to the state without an opening. Since this is carried out separately for each skin panel with one of the openings and the reinforcement arrangement with the longitudinal and transverse reinforcement elements is not changed, there is further brought about no impairment of adjacent skin panels or the reinforcement arrangement of longitudinal and transverse reinforcement elements. It is thereby also possible in a simple manner to construct several adjacent skin panels in the manner described without, in this instance, having to go beyond the individual consideration of the skin panels so that there is no limitation with regard to the number and the arrangement of adjacent skin panels which can be constructed in the manner described. Furthermore, the electronic arrangement is simple to install and maintain and a subsequent installation in an existing aircraft is possible in a simple manner. In addition, it is optionally and flexibly possible for each of the skin panels to construct the electronic arrangement in such a manner that at least one of the electronic components, such as, for example, an antenna element, protrudes outward from the structural portion or aircraft or for none of the electronic components to protrude outward from the structural portion or aircraft. In the latter case, during operation of the corresponding aircraft, no additional aerodynamic loads act on the electronic arrangement so that they can be produced with a particularly low weight, the air resistance is not influenced in an unfavorable manner and the aircraft can have a better visual appearance.

In a preferred embodiment, the structural elements each have a first sealing device, such as, for example, a sealing ring, and the frame of the structural elements has a respective annularly closed sealing face. The frame of each of the structural elements is then secured to the outer skin in the corresponding skin panel in such a manner that the sealing face is arranged at the side of the outer skin opposite the outer face, is opposite an annularly closed portion of the outer skin which surrounds the respective opening in the respective skin panel and the first sealing device is arranged between the portion of the outer skin and the sealing face. With this embodiment, it is possible in a particularly simple manner for a reliable pressure-tight sealing to be produced between the outer skin and the frame.

In a preferred embodiment, the structural elements each have a large number of securing elements, such as, for example, in particular, screws or other releasable connection means. The frames of the structural elements then each have a corresponding large number of holes which are adapted to receive the securing elements for securing the respective frame to the outer skin. The connection between the outer skin and the structural element is preferably carried out directly but can also be carried out via an intermediate element, such as, for example, a connection bracket or clip. The securing elements are consequently part of the respective structural element and contribute to meeting the described requirements concerning the capability of the structural element for pressure-tight closure and for transmitting tensile, pressure and shearing forces.

In a preferred embodiment, the frame of one, more or all of the structural elements has a respective through-opening which connects a side of the frame located at the side of the outer face to an opposing side of the frame and extends completely or partially through the at least one of the electronic components of the respective structural element. This electronic component may, for example, be or have an electronic transmission and/or receiving unit which transmits or receives radio signals by means of an additional electronic component in the form of an antenna element, a cable or a connection for electrical connection to an external unit. In each case, each of these structural elements has at least one second sealing device which is configured and arranged in such a manner that a passage of air through the through-opening of the frame is prevented. Each such second sealing device is preferably arranged between one of the electronic components and the frame of the respective structural element which may, for example, be the same electronic component which extends through the through-opening of the frame or another electronic component of the respective structural element.

In a preferred embodiment, the frame of one, more or all of the structural elements has a portion which annularly surrounds a receiving space, in which one, more or all of the electronic components of the respective structural element are partially or completely arranged. The frame may, in particular, be constructed in the manner of a trough or have a trough-like portion, wherein the receiving space is then formed by the interior of the trough. As a result of this configuration, it is, in any case, advantageously possible for the electronic components not to protrude or not to substantially protrude from the opening beyond the outer face of the outer skin in the skin panel. In this embodiment and also other embodiments, there may be provision for an outer face of at least one of the structural elements to be flush with the outer face of the outer skin in the respective skin panel so that the electronic arrangement does not or does not significantly increase the air resistance. A portion or portions of the outer face of the structural element may then be formed completely by the frame, completely by one or more of the electronic components or partially by the frame and partially by one or more of the electronic components. If the relevant structural element has a cover, as mentioned above, it is preferable for an outer face of the cover to be flush with the outer face of the outer skin in the respective skin panel and for the outer face of the structural element to consequently be formed partially by the cover of one of the structural elements or the covers of several of the structural elements.

In a preferred embodiment, one, several or all of the structural elements is/are configured in such a manner that the respective structural element can be removed as a unit from the outer skin in the respective skin panel and secured thereto, that is to say, including all the electronic components which are secured to the frame of the structural element so that these do not have to be released from the frame for securing or for removing the structural element. In this instance, the second sealing device, if present, may then, for example, in a partial or complete cover comprise or have epoxy resin or another sealing material. In any case, the assembly is thereby further simplified.

In a preferred embodiment, the electronic arrangement has two or more of the skin panels and a corresponding large number of the structural elements, wherein two or more of the skin panels are preferably arranged adjacent to each other. The relevant skin panels may, for example, be arranged in a row or in a two-dimensional matrix, wherein additional skin panels may be located between them where applicable, or they directly adjoin each other. In any case, the structural elements which are associated with these skin panels are configured in such a manner that at least one of the electronic components thereof is common to the structural elements and is secured to the frame of each of the structural elements. In other words, the respective electronic component then extends over several skin panels. In particular, such an electronic component may, for example, be an extensive antenna element whose dimensions are greater than those of the opening of an individual panel of the skin panels or than those of an individual panel of the skin panels. Nonetheless in this embodiment, there is also the advantage that the reinforcement arrangement does not have to be modified and that each of the skin panels can be considered separately with respect to the construction and the closure of the respective openings. As a result of the configuration of the electronic arrangement according to the invention, it is generally advantageously readily possible to provide electronic components, such as, for example, antenna elements, of different sizes and, in particular, also relatively large electronic components on or in an aircraft, such as, for example, on or in an aircraft fuselage.

In a preferred embodiment, in each of the skin panels the respective opening and the associated structural element are constructed and sized in such a manner that the securing of the frame of the structural element to the outer skin can be released and produced from the side of the outer face (in particular by releasing or tightening screws or other securing elements of the respective structural element) and the structural element can be removed from the side of the outer face after the securing is released by the frame being tilted and moved outward out of the opening or the structural element can be arranged in the securing position prior to the securing being produced from the side of the outer face by the frame being tilted and introduced into the opening. There are then preferably required no operating steps which require access to the inner side of the electronic arrangement, that is to say, in the interior of the corresponding aircraft. Only when an electronic component which extends over a plurality of skin panels is provided, as has been explained above, may it be necessary to remove them in a previous step from the corresponding structural elements and, to this end, to access an inner side of the respective frame. Subsequently, however, the frames and any other electronic components of the individual structural elements can preferably be removed again in the manner described simply using operating steps from the side of the outer face.

In a preferred embodiment, the electronic arrangement is an antenna arrangement. One, more or all of the electronic components of one, more or all of the structural elements are then an antenna element. Such an antenna element may be or have a KU, KA or L band antenna, a phased array antenna or an electronically controlled antenna and/or have a printed circuit board. The respective antenna element may be an individual integral antenna element or have an arrangement of several separate antenna elements which cooperate in order to transmit and/or receive radio waves. Alternatively, the electronic arrangement may be, for example, a laser device and/or a communication device. Also in these cases, at least one of the electronic components may preferably be an antenna element of the configuration described.

The electronic arrangement according to one of the above-described embodiments is part of an aircraft in the installed state. According to the present invention, therefore, an aircraft having a structure and an electronic arrangement according to one of the embodiments described herein is also provided. The structure has a large number of longitudinal and transverse reinforcement elements and an outer skin. The structural portion is part of the structure, that is to say, in particular, the longitudinal and transverse reinforcement elements of the structural portion of the electronic arrangement are part of the longitudinal and transverse reinforcement elements of the structure. If, for example, the structural portion is a fuselage structural portion, the aircraft has a fuselage and an electronic arrangement according to one of the embodiments described herein. The fuselage then has a fuselage structure having a large number of longitudinal and transverse reinforcement elements and an outer skin. The fuselage structural portion is part of the fuselage structure, that is to say, in particular, the longitudinal and transverse reinforcement elements of the fuselage structural portion of the antenna arrangement are part of longitudinal and transverse reinforcement elements of the fuselage.

The aircraft may have one or more of the electronic arrangements. In this instance, it is advantageous for the electronic arrangement to be able to be provided at any location in the aircraft and, for example, at any location in the fuselage of the aircraft, for example, at the upper side, at the lower side or laterally. The same applies to an arrangement on or in other portions of the aircraft, such as, for example, a rudder unit or a wing.

In a preferred embodiment of the aircraft, the structure has, in addition to the skin panels of the structural portion, which can then also be referred to as first skin panels, a large number of additional skin panels, which can also be referred to as second skin panels and of which each one is a portion of the outer skin which is defined between two directly adjacent longitudinal reinforcement elements of the longitudinal reinforcement elements and two directly adjacent transverse reinforcement elements of the transverse reinforcement elements of the structure. For each of the first skin panels, the respective opening and the respective structural element are constructed in such a manner that the same opening is constructed in the same manner in each of the second skin panels of the structure and can be closed by the structural element in such a manner that the corresponding second skin panel of the structure has at least the same pressure tightness and at least the same resistance with respect to tensile, pressure and shearing forces which act in the extent direction of the outer skin in the second skin panel or in the plane defined by the outer skin in the second skin panel as the same second skin panel without the corresponding opening. As a result of this configuration, it is advantageously possible for the demands on the structural elements with regard to ensuring pressure tightness and transmission of such tensile, pressure and shearing forces to be independent of the panel of the first or second skin panels in which the corresponding opening and the structural element are arranged. It is therefore possible to define one or more "standard openings" with predetermined standard dimensions and shapes and requirements on associated structural elements which are dependent only on the respective "standard opening" but not on the skin panel in which the opening is formed. The electronic arrangement can thereby be produced in a particularly simple and cost-effective manner. The definition of only one such standard opening or a few such standard openings also has a series of other advantages. It is thus possible for each such standard opening to provide a corresponding structural element which has no electronic component, but which serves only to close the respective opening, that is to say, it is a cover or a closure for the opening. Such covers or closures can be stored in a simple and cost-effective manner and therefore enable aircraft to be provided from the outset in a cost-effective manner with closed standard openings which can then be replaced by the airlines for modification of the aircraft by replacing the covers with the structural elements according to the invention with electronic components. It is further possible to replace structural elements according to the invention rapidly with the corresponding cover, for example, in the event of defects for rapid restoration of the operational readiness of the aircraft or, if desired, to permanently reverse the modification of the aircraft with a standard opening and a structural element according to the invention. Furthermore, there is the advantage that it is possible in a simple and cost-effective manner to provide a catalogue with various devices from which the operator of an aircraft can select in order to modify the aircraft. Each such device has one or more electronic components which are provided in the described manner as part of a structural element which fits the standard opening or one of the standard openings.

According to the present invention, a method is further provided for providing an electronic arrangement according to one of the above-described embodiments. In this instance, a structural portion of a structure of an aircraft is provided as described above. It consequently has a reinforcement arrangement of elongate longitudinal and transverse reinforcement elements which are connected to each other, an outer skin which is arranged at one side of the reinforcement arrangement and which is secured to the longitudinal and transverse reinforcement elements, wherein a face of the outer skin facing away from them forms an outer face of the structural portion and one or more skin panels, each of which is a portion of the outer skin which is defined between two directly adjacent longitudinal reinforcement elements of the longitudinal reinforcement elements and two directly adjacent transverse reinforcement elements of the transverse reinforcement elements. Furthermore, one or more structural elements is/are provided as described above and therefore, in each case, has/have a frame and one or more electronic components which are secured to the respective frame. Furthermore, in one, more or all of the skin panels in the outer skin, an opening which is arranged completely in the skin panel is formed as also already described in detail above. Finally, an associated element of the structural elements is provided separately for each of the skin panels with one of the openings, for example, by being produced or selected from a group of prefabricated structural elements, and is releasably secured in the manner already described above with the frame thereof to the outer skin in the corresponding skin panel at the side of the outer skin opposite the outer face in such a manner that it closes the corresponding opening in such a manner that the skin panel has at least the same pressure tightness and at least the same resistance with respect to tensile, pressure and shearing forces which act in the extent direction of the outer skin in the skin panel or in the plane defined by the outer skin in the skin panel as the same skin panel without the corresponding opening.

In a preferred embodiment of the method, the construction of the opening in at least one of the skin panels involves, in each of the skin panels (that is to say, in each skin panel in which one of the openings is intended to be formed), the dimensions and the shape of the opening which is intended to be formed being selected from a group which comprises one or more predetermined openings with predetermined dimensions and shapes and for which predetermined minimum requirements concerning a structural element are defined and ensure that, after the formation of an opening with the selected dimensions and the selected shape and the releasable securing of a structural element which meets the corresponding predetermined minimum requirements with the frame thereof on the outer skin in the corresponding skin panel at the side of the outer skin opposite the outer face, the corresponding opening is closed by the structural element in such a manner that the skin panel has at least the same pressure tightness and at least the same resistance with respect to tensile, pressure and shearing forces which act in the extent direction of the outer skin in the skin panel or in the plane defined by the outer skin in the skin panel as the same skin panel without the corresponding opening. As already explained above, the openings in this embodiment are advantageously standardized so that the structural elements can be provided in a particularly simple and cost-effective manner without impairing the sealing and the mechanical properties of the outer skin. The provision of the structural element for each of the skin panels with one of the openings is then carried out in such a manner that the respective structural element meets the predetermined minimum requirements which are defined for the opening selected for the respective skin panel.

In this embodiment, it is further preferable for the electronic arrangement to be provided in an aircraft in accordance with the embodiment described above which also has second skin panels. The aircraft may, for example, be an aircraft of a predetermined type or a predetermined manufacturer. The group is defined in such a manner that, when each of the openings of the group is formed in one of the first skin panels (prior to the formation of the opening which is actually intended to be formed) or in one of the second skin panels and the opening is closed with a structural element which meets the associated minimum requirements, the corresponding first skin panel or the corresponding second skin panel has the same pressure tightness and at least the same resistance with respect to tensile, pressure and shearing forces which act in the extent direction of the outer skin in the respective skin panel or in the plane defined by the outer skin in the respective skin panel as the same skin panel without the corresponding opening. As a result of this configuration, the standardization of the openings and the usability of the associated structural elements is expanded to all the skin panels of the aircraft defined between adjacent longitudinal and transverse reinforcement elements.

BRIEF DESCRIPTION OF THE DRAWINGS

The invention is explained in greater detail below with reference to the figures, in which two embodiments are illustrated. In the drawings:

FIG. 3a is a schematic side view of an antenna arrangement according to a first embodiment of the present invention.

DETAILED DESCRIPTION OF THE PREFERRED EMBODIMENTS

Figure 1:
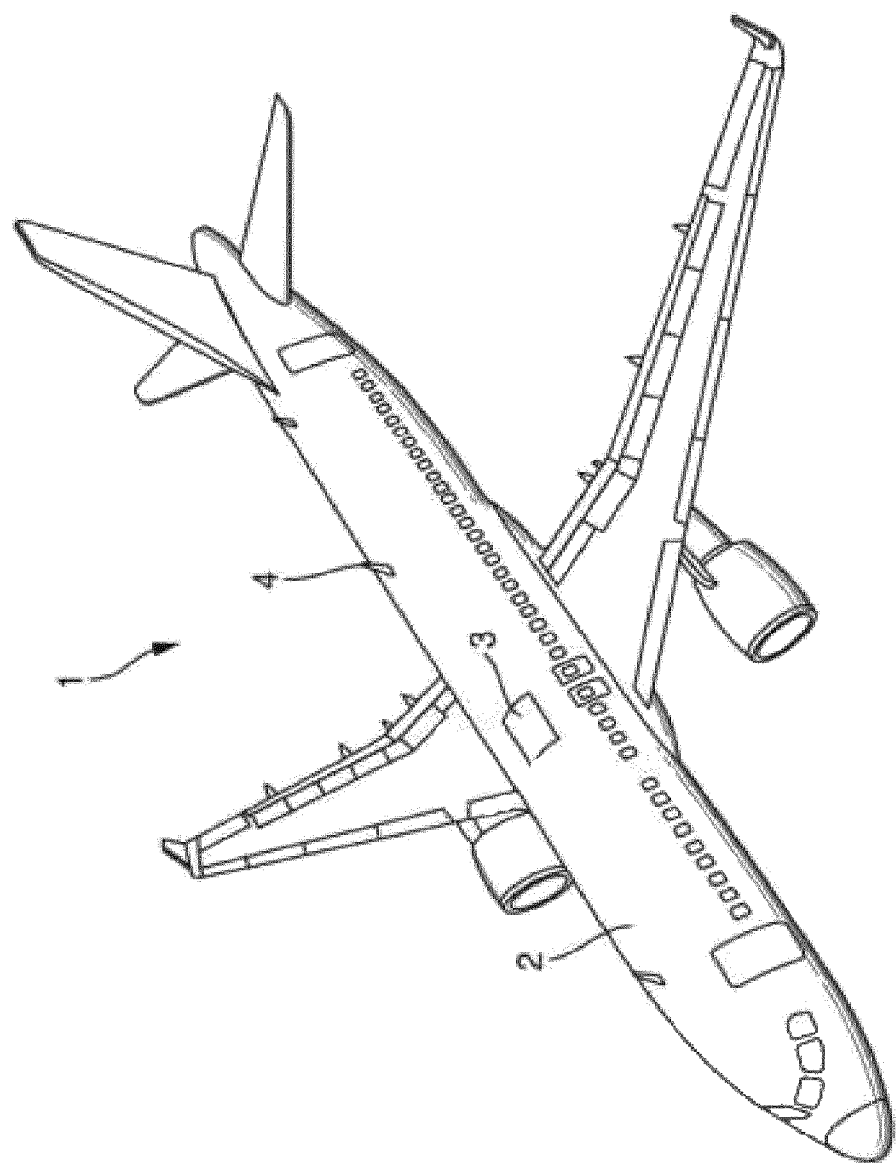
FIG. 1 is a schematic, perspective view of an aircraft with an electronic arrangement according to the invention which is constructed as an antenna arrangement.

The aircraft 1 shown in FIG. 1 has a fuselage 2 and an electronic arrangement 3 according to the invention which is constructed as an antenna arrangement. In addition to the antenna arrangement 3, for the purposes of illustration conventional blade antennae 4 are also shown and are secured to the fuselage 2 from the outer side and protrude outward from the fuselage 2. In contrast, the upper side of the antenna arrangement 3 is flush or substantially flush with the surface of the fuselage 2 so that the air resistance of the fuselage 2 is not or not substantially increased by the antenna arrangement 3 and no or substantially no increased aerodynamic loads act on the antenna arrangement. It should be noted—as explained below—that the antenna arrangement 3 according to the invention can also be configured in such a manner that an antenna element, such as, for example, a blade antenna element, protrudes outward from the fuselage 2. In FIG. 1, the antenna arrangement 3 is, for example, arranged on the upper side of the fuselage 2. The antenna arrangement may, however, also be located at any other location of the fuselage 2, for example, at a side or at the lower side. The fuselage 2 conventionally has a fuselage structure having a grid-like arrangement of longitudinal and transverse reinforcement elements which are connected to each other, on which arrangement an outer skin is arranged (not shown separately for the aircraft in FIG. 1). As can be seen in the other figures, the antenna arrangement 3 has a fuselage structural portion or a fuselage structural element 5 which is part of the fuselage structure of the fuselage 2 and which is constructed integrally with the fuselage structure of the fuselage 2 or which may be integrated as a separate component therein. It should be noted that the antenna arrangement 3 may also be provided at locations other than the fuselage 2, such as, for example, the rudder unit or a wing. Purely by way of example, the figures show the arrangement on the fuselage 2. In the case of an arrangement at another location, in place of the fuselage structural portion 5 a structural portion of the corresponding part-structure of the aircraft is provided, such as, for example, a rudder unit structural portion or a wing structural portion.

Figure 2:
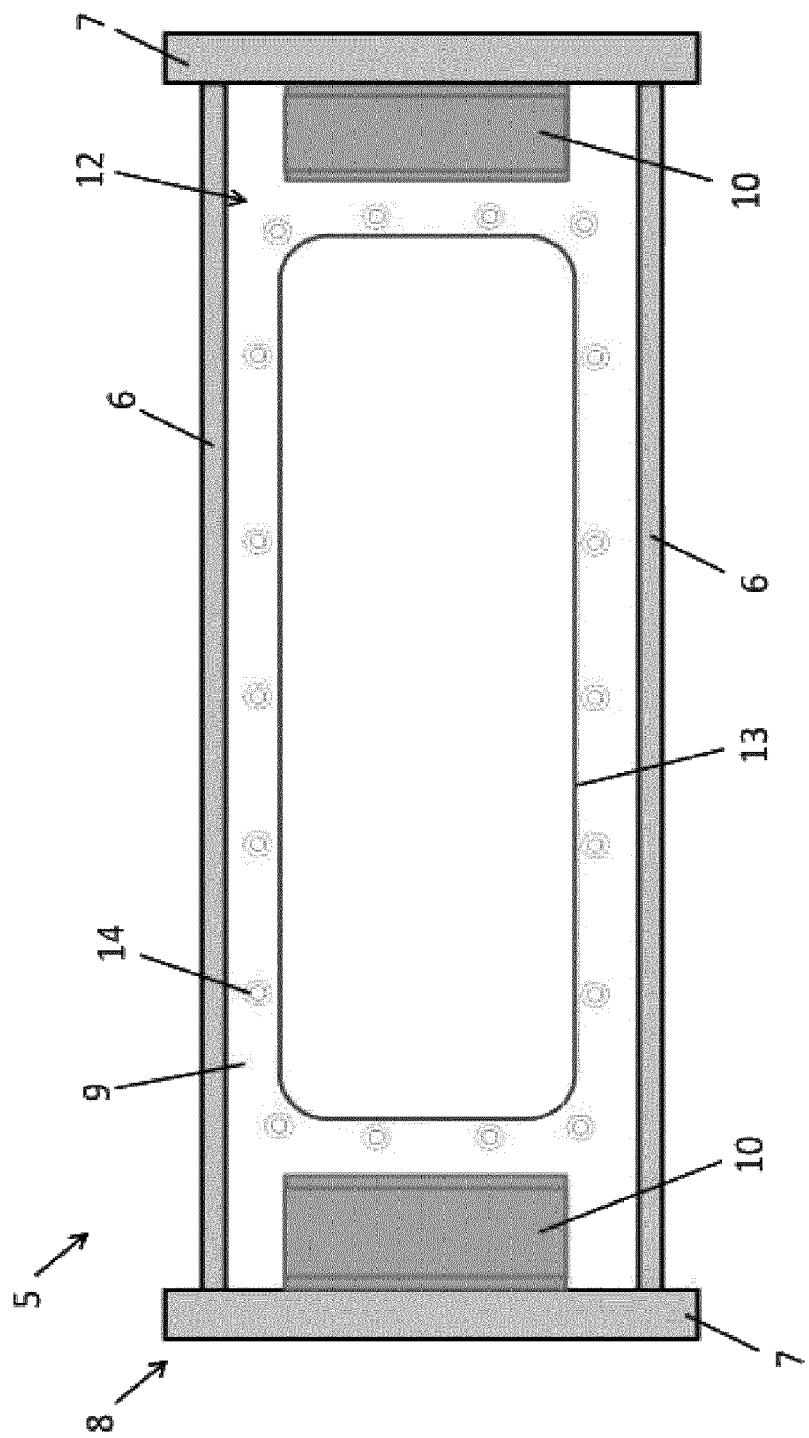
FIG. 2 is a schematic plan view of a structural portion of a structure of an aircraft which has a skin panel in which an opening is formed.

FIG. 2 is a schematic plan view of a structural portion 5 of the aircraft 1 which—as set out above—may, for example, be a fuselage structural portion. The structural portion 5 has two longitudinal reinforcement elements 6 and two transverse reinforcement elements 7 which are connected to each other and which together form a reinforcement arrangement 8 of longitudinal and transverse reinforcement elements 6, 7. The longitudinal reinforcement elements 6 extend in the state installed in the fuselage 2 in the longitudinal direction of the fuselage 2 and the transverse reinforcement elements 7 extend in the circumferential direction of the fuselage 2 perpendicularly to the longitudinal reinforcement elements 6. On the other hand, the structural portion 5 has an outer skin 9 which is arranged at one side of the reinforcement arrangement 8 and which is secured thereto. As can be seen inter alia in FIG. 3a, which is a schematic side view of a first embodiment of an antenna arrangement 3 according to the invention, the outer skin 9 is secured to the longitudinal reinforcement elements 6 by means of clips 10 and directly to the transverse reinforcement elements 7. In the state installed in the fuselage 2, an outer face 11 of the outer skin 9 forms a portion of the outer face or the outer side of the fuselage 2. The reinforcement arrangement 8 is located at the side of the outer skin 9 opposite the outer face 11.

The outer skin 9 is provided not only in the region of the structural portion 5, but instead extends beyond it. However, FIG. 2 shows that between the longitudinal reinforcement elements 6 and the transverse reinforcement elements 7 a rectangular portion of the outer skin 9 which is referred to as a skin panel 12 is defined. Normally, the outer skin 9 in this skin panel 12 is closed. In order to form an antenna arrangement 3 according to the invention, however, an opening 13 is formed in the skin panel 12 in the outer skin 9, as shown in FIG. 2. This opening 13 is arranged completely in the skin panel 12 and is surrounded by a large number of holes 14 which are spaced apart from each other.

Figure 3B:
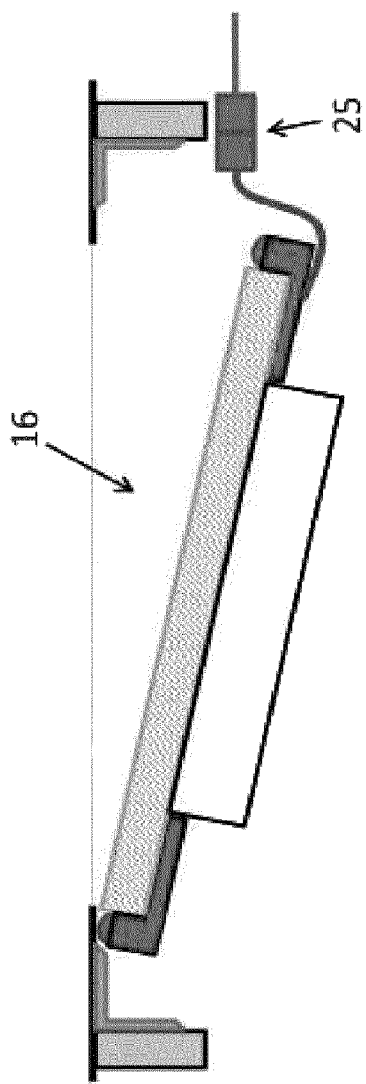
FIGS. 3b and 3c show the removal or the assembly of a structural element of the antenna arrangement of FIG. 3a, FIG. 4 is a schematic side view of an antenna arrangement according to a second embodiment of the present invention.
Figure 3C:
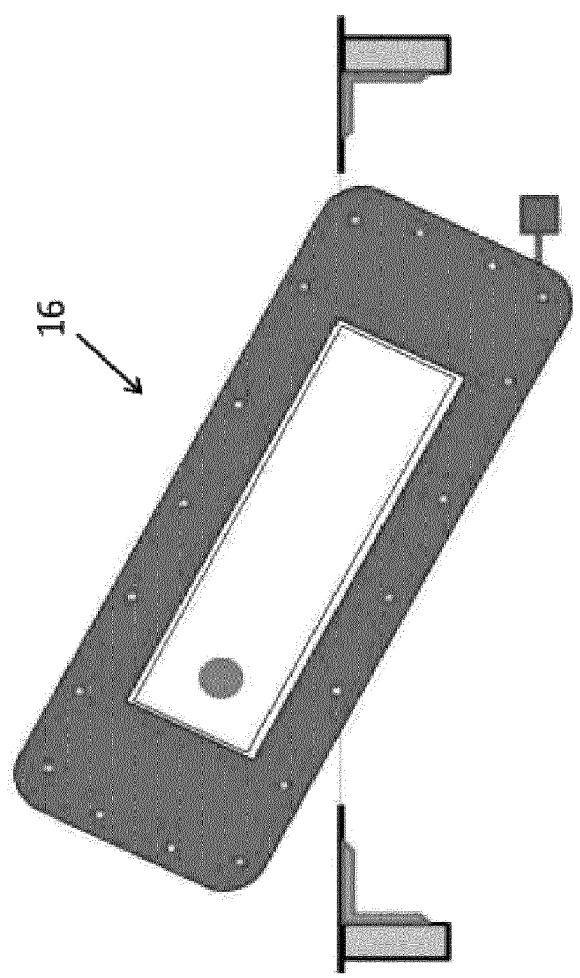

FIGS. 3a to 3c show a first embodiment of the antenna arrangement 3. The antenna arrangement 3 has the structural element 5 whose structure is shown in FIG. 2. The opening 13 is closed by means of a structural element 15 which is arranged at the side of the outer skin 9 opposite the outer face 11 and which is secured to the outer skin 9. The structural element 15 has a rigid frame 16 with a base plate 17 and a circumferential upright edge 29, a sealing ring 18 which is arranged on a sealing face 19 formed by the surface of the edge 29 and a plurality of electronic components 20a, 20b, 20c which are secured to the frame 16. In the edge 29 of the frame 16 there are provided a large number of holes 21 which in terms of number, arrangement and orientation correspond to the holes 14 in the outer skin 9 so that the frame 16 and consequently the structural element 15 can be secured in the position shown in FIG. 3a using a large number of screws (or other releasable connection elements) 22 to the outer skin 9 in the opening 13. In this instance, it is preferable for a head of the screws or connection elements 22 to be recessed in the outer skin in each case and to be flush or substantially flush with the outer face of the outer skin. The electronic components comprise an antenna element 20a, an antenna electronic system 20b which is connected to the antenna element 20a and a connector 20c which is provided on the antenna electronic system 20b. As a result of the configuration of the frame 16 with the base plate 17 and the upright edge 29, the frame 16 is configured in a trough-like manner with a receiving space 23, in which the antenna element 20a is arranged in such a manner that the surface thereof is flush or substantially flush with the outer face 11 of the outer skin 9. The antenna electronic system 20b is provided on the lower side of the antenna element 20a and extends through a through-opening 24 formed in the base plate 17. This advantageously affords the possibility of cooling the antenna electronic system 20b actively from inside the aircraft 1 with conditioned cabin air, for example, in the event of high thermal output of the antenna electronic system 20b or in the event of hot external temperatures, in particular in direct sunshine incident on the antenna element 20a. This advantage also applies to any other embodiments in which one of the electronic components is completely or partially accessible from inside the aircraft 1. Even if this is not the case, a cooling action of the electronic components can be achieved by the structural element being actively cooled from inside the aircraft with conditioned cabin air and the structural element transmitting the cooling action to the electronic component or electronic components. In order to seal the through-opening 24 in the embodiment shown, an epoxy resin seal (not shown) may be provided, for example, between the antenna element 20a and the frame 16.

Since the opening 13 is located completely in the skin panel 12 and requires no modification of the longitudinal and transverse reinforcement elements 6, 7 and since the structural element 15 closes the opening 13 and is configured in such a manner that it ensures the complete reproduction of the pressure tightness, which has been destroyed by the opening 13, and strength of the outer skin 9 in the skin panel 12 with respect to tensile, pressure and shearing forces which act in the extent direction of the outer skin 9 in the skin panel 12 or in the plane defined by the outer skin 9 in the skin panel 12, the antenna arrangement 3 can be produced in a particularly simple manner and also installed subsequently on the aircraft 1 without impairing other skin panels and the reinforcement arrangement of the aircraft 1. Furthermore, the structural element 15 can be released and removed from the outer skin 9 as a complete unit in a simple manner by an operator located outside the aircraft. As shown in FIGS. 3b and 3c, it is simply necessary to release the screws or other releasable connection elements 22, to tilt the structural element 15 inward at one side and where applicable to release a plug type connection 25 to external units (see FIG. 3b) and subsequently to tilt the structural element 15 in an oblique manner and to remove it from the opening 13 (see FIG. 3c). The installation of the structural element 15 is possible in just as simple a manner by reversing the sequence of these steps.

FIG. 4 shows a second embodiment of the antenna arrangement 3. This differs from the embodiment shown in FIGS. 3a to 3c substantially only in that the frame 16 is not constructed in a trough-like manner and has no receiving space and in that, in place of the antenna element 20a, a leaf antenna element 26 which projects outwardly from the outer face 11 of the outer skin 9 is provided.

Figure 5:
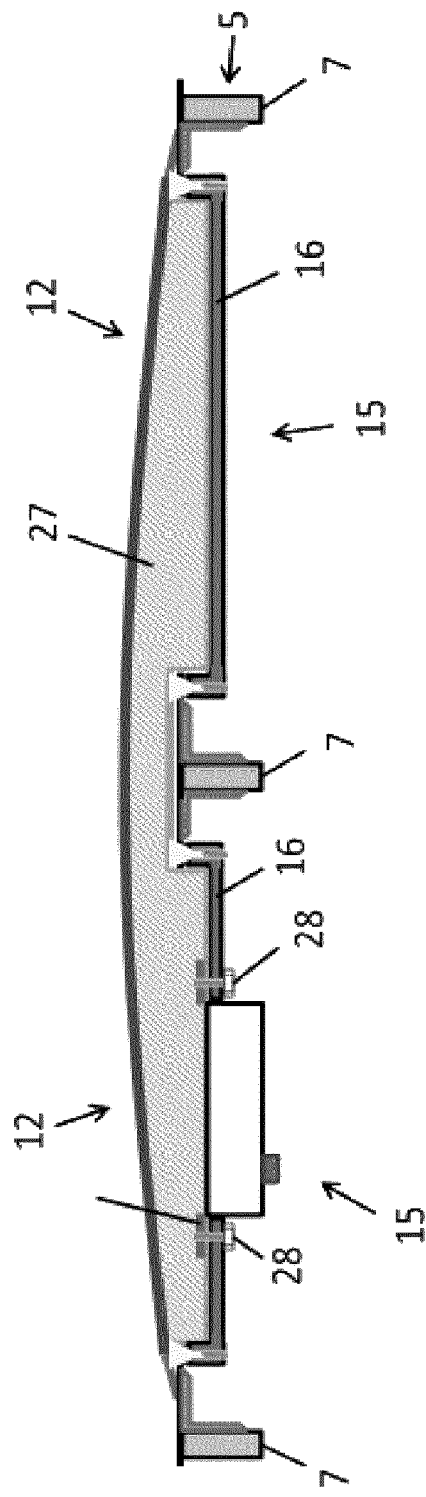
FIG. 5 is a schematic side view of an antenna arrangement according to a third embodiment of the present invention.

FIG. 5 shows a third embodiment of the antenna arrangement 3. In this embodiment, the structural portion 5 has three longitudinal reinforcement elements 7 and two adjacent skin panels 12, wherein in each of these skin panels 12 an opening 13 and a structural element 15 are provided. The one structural element 15 (on the left in FIG. 5) has substantially the same structure as the structural element 15 of FIG. 3a. In place of the antenna element 20a, however, an antenna element 27 which shares this structural element 15 with the other structural element 15 (on the right in FIG. 5) and which is secured to each of the frames 16 of the two structural elements 15 is provided. This antenna element 27 therefore extends over both skin panels 12 and can consequently be constructed to be larger than the antenna element 20a. In order to be able to remove the structural elements 15, the antenna element 27 must initially be removed from the frame 16. To this end, inter alia from the inner side of the aircraft 1, screws or other releasable connection elements 28, by means of which a sealing device for sealing the through-opening in the frame 16 of the left structural element 15 is secured, have to be released (cf. FIG. 3a with regard to the through-opening). Subsequently, first the antenna element 27 and then the structural element 15 can be removed from the outer side. Since the structural elements 15 in each of the skin panels 12 separately ensure the complete reproduction of the pressure tightness destroyed by the openings 13 and strength of the outer skin 9 in the skin panels 12 with respect to tensile, pressure and shearing forces which act in the extent direction of the outer skin 9 in the skin panels 12 or in the plane defined by the outer skin 9 in the skin panels 12, it is possible in a very simple manner to provide such antenna elements which extend over several skin panels 12.

In each of the embodiments, the openings 13 do not have any desired dimensions and shapes, but are instead selected from a predetermined group of standard openings each with predetermined dimensions and shapes. Each of these standard openings is associated with respective minimum requirements concerning a structural element 15 for closing the respective opening. These minimum requirements are defined in such a manner that, after the closure of the associated opening, the pressure tightness and the shearing resistance in each skin panel is completely produced again.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electronic arrangement for an aircraft comprising:
a structural portion of a structure of the aircraft which comprises
a reinforcement arrangement of elongate longitudinal and transverse reinforcement elements which are connected to each other,
an outer skin which is arranged at one side of the reinforcement arrangement and which is secured to the longitudinal and transverse reinforcement elements, wherein a face of the outer skin facing away from them forms an outer face of the structural portion, and
one or more skin panels, each of which is a portion of the outer skin which is defined between two directly adjacent longitudinal reinforcement elements of the longitudinal reinforcement elements and two directly adjacent transverse reinforcement elements of the transverse reinforcement elements, and
one or more structural elements, each of which has a frame and one or more electronic components which are secured to the frame,
wherein, in at least one of the skin panels in the outer skin, an opening, which is arranged completely in the skin panel, is formed, and for each skin panel with the opening, an associated element of the structural elements is provided separately and is configured and is releasably secured with the frame thereof to the outer skin in the corresponding skin panel at the side of the outer skin opposite the outer face, such that the associated element closes a corresponding opening such that the skin panel has at least the same pressure tightness and at least the same resistance with respect to tensile, pressure and shearing forces which act in an extent direction of the outer skin in the skin panel as the same skin panel without the corresponding opening,
wherein the frame of at least one of the structural elements has a through-opening which connects a side of the frame located at the side of the outer face to an opposing side of the frame and which extends at least partially through the at least one of the electronic components of the respective structural element.

2. The electronic arrangement as claimed in claim 1, wherein the structural elements each have a first sealing device and the frame of the structural elements has an annularly closed sealing face,
wherein the frame of each of the structural elements is secured to the outer skin in a corresponding skin panel in such a manner that the sealing face is arranged at the side of the outer skin opposite the outer face, is opposite an annularly closed portion of the outer skin which surrounds the respective opening in the respective skin panel and the first sealing device is arranged between the portion of the outer skin and the sealing face.

3. The electronic arrangement as claimed in claim 1, wherein the structural elements each have a large number of securing elements and the frames of the structural elements each have a corresponding large number of holes which are adapted to receive the securing elements for securing the respective frame to the outer skin.

4. The electronic arrangement as claimed in claim 1,
wherein each of these structural elements has at least one second sealing device which is configured and arranged in such a manner that a passage of air through the through-opening of the frame is prevented.

5. The electronic arrangement as claimed in claim 4, wherein the second sealing device is arranged between one of the electronic components and the frame of the respective structural element.

6. The electronic arrangement as claimed in claim 1, wherein the frame of at least one of the structural elements has a portion which annularly surrounds a receiving space, in which at least one of the electronic components of the respective structural element is completely or partially arranged.

7. The electronic arrangement as claimed in claim 1, wherein at least one of the structural elements is configured in such a manner that the at least one of the structural elements can be removed as a unit from the outer skin in the respective skin panel and secured thereto.

8. The electronic arrangement as claimed in claim 1, which has at least two of the skin panels and at least two of the structural elements, wherein at least two of the skin panels are arranged adjacent to each other and the structural elements which are associated with these skin panels are configured such that at least one of the electronic components thereof is common to the structural elements and is secured to the frame of each of the structural elements.

9. The electronic arrangement as claimed in claim 1, wherein in each of the skin panels the respective opening and the associated structural element are constructed and sized in such a manner that the securing of the frame of the structural element to the outer skin can be produced and released from the side of the outer face and the structural element can be removed after the securing is released from the side of the outer face by the frame being tilted and moved outward out of the opening, or the structural element can be arranged in a securing position prior to the securing being produced from the side of the outer face by the frame being tilted and introduced into the opening.

10. The electronic arrangement as claimed in claim 1, wherein the electronic arrangement is an antenna arrangement in which at least one of the electronic components of at least one of the structural elements is an antenna element.

11. An aircraft having a structure and an electronic arrangement as claimed in claim 1,
wherein the structure has a large number of longitudinal and transverse reinforcement elements and an outer skin, and
wherein the structural portion is part of the structure.

12. The aircraft as claimed in claim 11,
wherein the structure, in addition to the skin panels of the structural portion, has a large number of additional skin panels, each of which is a portion of the outer skin which is defined between two directly adjacent longitudinal reinforcement elements of the longitudinal reinforcement elements and two directly adjacent transverse reinforcement elements of the transverse reinforcement elements of the structure,
wherein, for each of the skin panels of the structural portion, the opening and the structural element are constructed such that the same opening can be constructed in the same manner in each of the additional skin panels of the structure and can be closed by the structural element such that a corresponding additional skin panel of the structure has at least the same pressure tightness and at least the same shearing strength as the same skin panel without a corresponding opening.

13. A method for providing an electronic arrangement as claimed in claim 1, wherein
there is provided a structural portion of a structure of an aircraft which has
a reinforcement arrangement of elongate longitudinal and transverse reinforcement elements which are connected to each other,
an outer skin which is arranged at one side of the reinforcement arrangement and which is secured to the longitudinal and transverse reinforcement elements, wherein a face of the outer skin facing away from them forms an outer face of the structural portion, and
one or more skin panels, each of which is a portion of the outer skin which is defined between two directly adjacent longitudinal reinforcement elements of the longitudinal reinforcement elements and two directly adjacent transverse reinforcement elements of the transverse reinforcement elements,
there are provided one or more structural elements, each of which has a frame and one or more electronic components which are secured to the frame,
in at least one of the skin panels in the outer skin an opening which is arranged completely in the skin panel is formed, and
for each of the skin panels with one of the openings, an associated element of the structural elements is provided separately and is releasably secured with the frame thereof to the outer skin in the corresponding skin panel at the side of the outer skin opposite the outer face such that the associated element of the structural elements closes the corresponding opening such that the skin panel has at least the same pressure tightness and at least the same resistance with respect to tensile, pressure and shearing forces which act in the extent direction of the outer skin in the skin panel as the same skin panel without the corresponding opening.

14. The method as claimed in claim 13,
wherein a construction of the opening in at least one of the skin panels has, in each of the at least one skin panel, selecting the dimensions and the shape of the opening which is intended to be formed from a group which comprises one or more predetermined openings with predetermined dimensions and shapes and for which predetermined minimum requirements concerning a structural element are defined and ensure that, after a formation of an opening with selected dimensions and a selected shape and a releasable securing of a structural element which meets the corresponding predetermined minimum requirements with the frame thereof on the outer skin in the corresponding skin panel at the side of the outer skin opposite the outer face, the corresponding opening is closed by the structural element such that the skin panel has at least the same pressure tightness and at least the same resistance with respect to tensile, pressure and shearing forces which act in the extent direction of the outer skin in the skin panel as the same skin panel without the corresponding opening, and
wherein provision of the structural element for each of the skin panels with one of the openings is carried out such that the respective structural element meets the predetermined minimum requirements which are defined for the opening selected for the respective skin panel.

15. The method as claimed in claim 14, wherein the electronic arrangement is provided in an aircraft, wherein the structure has a large number of longitudinal and transverse reinforcement elements and an outer skin, wherein the structural portion is part of the structure, wherein the structure, in addition to the skin panels of the structural portion, has a large number of additional skin panels, each of which is a portion of the outer skin which is defined between two directly adjacent longitudinal reinforcement elements of the longitudinal reinforcement elements and two directly adjacent transverse reinforcement elements of the transverse reinforcement elements of the structure, wherein, for each of the skin panels of the structural portion, the opening and the structural element are constructed such that the same opening can be constructed in the same manner in each of the additional skin panels of the structure and can be closed by the structural element such that the corresponding additional skin panel of the structure has at least the same pressure tightness and at least the same shearing strength as the same skin panel without the corresponding opening, and wherein the group is defined in such a manner that, when each of the openings of the group is formed in one of the skin panels of the structural portion or in one of the additional skin panels of the structure and the opening is closed with a structural element which meets associated minimum requirements, the corresponding skin panel of the structural portion or the corresponding additional skin panel of the structure has at least the same pressure tightness and at least the same resistance with respect to tensile, pressure and shearing forces which act in the extent direction of the outer skin in the respective skin panel as the same skin panel without the corresponding opening.

16. An electronic arrangement for an aircraft comprising:

a structural portion of a structure of the aircraft which comprises a reinforcement arrangement of elongate longitudinal and transverse reinforcement elements which are connected to each other, an outer skin which is arranged at one side of the reinforcement arrangement and which is secured to the longitudinal and transverse reinforcement elements, wherein a face of the outer skin facing away from them forms an outer face of the structural portion, and one or more skin panels, each of which is a portion of the outer skin which is defined between two directly adjacent longitudinal reinforcement elements of the longitudinal reinforcement elements and two directly adjacent transverse reinforcement elements of the transverse reinforcement elements, and one or more structural elements, each of which has a frame and one or more electronic components which are secured to the frame, wherein, in at least one of the skin panels in the outer skin, an opening, which is arranged completely in the skin panel, is formed, and for each skin panel with the opening, an associated element of the structural elements is provided separately and is configured and is releasably secured with the frame thereof to the outer skin in the corresponding skin panel at the side of the outer skin opposite the outer face, such that the associated element closes a corresponding opening such that the skin panel has at least the same pressure tightness and at least the same resistance with respect to tensile, pressure and shearing forces which act in an extent direction of the outer skin in the skin panel as the same skin panel without the corresponding opening, wherein the structural portion has at least two of the skin panels and at least two of the structural elements, wherein at least two of the skin panels are arranged adjacent to each other and the structural elements which are associated with these skin panels are configured such that at least one of the electronic components thereof is common to the structural elements and is secured to the frame of each of the structural elements.

17. An aircraft having a structure and an electronic arrangement as claimed in claim 16, wherein the structure has a large number of longitudinal and transverse reinforcement elements and an outer skin, and wherein the structural portion is part of the structure.

18. An electronic arrangement for an aircraft comprising:

a structural portion of a structure of the aircraft which comprises a reinforcement arrangement of elongate longitudinal and transverse reinforcement elements which are connected to each other, an outer skin which is arranged at one side of the reinforcement arrangement and which is secured to the longitudinal and transverse reinforcement elements, wherein a face of the outer skin facing away from them forms an outer face of the structural portion, and one or more skin panels, each of which is a portion of the outer skin which is defined between two directly adjacent longitudinal reinforcement elements of the longitudinal reinforcement elements and two directly adjacent transverse reinforcement elements of the transverse reinforcement elements, and one or more structural elements, each of which has a frame and one or more electronic components which are secured to the frame, wherein, in at least one of the skin panels in the outer skin, an opening, which is arranged completely in the skin panel, is formed, and for each skin panel with the opening, an associated element of the structural elements is provided separately and is configured and is releasably secured with the frame thereof to the outer skin in the corresponding skin panel at the side of the outer skin opposite the outer face, such that the associated element closes a corresponding opening such that the skin panel has at least the same pressure tightness and at least the same resistance with respect to tensile, pressure and shearing forces which act in an extent direction of the outer skin in the skin panel as the same skin panel without the corresponding opening, wherein in each of the skin panels the respective opening and the associated structural element are constructed and sized in such a manner that the securing of the frame of the structural element to the outer skin can be produced and released from the side of the outer face and the structural element can be removed after the securing is released from the side of the outer face by the frame being tilted and moved outward out of the opening, or the structural element can be arranged in a securing position prior to the securing being produced from the side of the outer face by the frame being tilted and introduced into the opening.

19. An aircraft having a structure and an electronic arrangement as claimed in claim 18,
wherein the structure has a large number of longitudinal and transverse reinforcement elements and an outer skin, and
wherein the structural portion is part of the structure.

* * * * *